C. P. JOHNSON.
TRANSMISSION GEARING.
APPLICATION FILED MAY 18, 1914.

1,150,433.

Patented Aug. 17, 1915.
2 SHEETS—SHEET 2.

WITNESSES:

INVENTOR
Chris P. Johnson
ATTORNEY

UNITED STATES PATENT OFFICE.

CHRIS P. JOHNSON, OF SAN FRANCISCO, CALIFORNIA, ASSIGNOR TO JOHNSON POWER WASHER CO., OF SAN FRANCISCO, CALIFORNIA, A CORPORATION OF CALIFORNIA.

TRANSMISSION-GEARING.

1,150,433.  Specification of Letters Patent.  Patented Aug. 17, 1915.

Application filed May 18, 1914. Serial No. 839,277.

*To all whom it may concern:*

Be it known that I, CHRIS P. JOHNSON, a citizen of the United States, residing in the city and county of San Francisco and State of California, have invented new and useful Improvements in Transmission-Gearing, of which the following is a specification.

This invention relates to a transmission gearing for power-driven washing machines.

The object of the invention is to provide a simple, substantial, cheaply manufactured and easily operated transmission gearing which is particularly adapted for attachment to washing machines, and which is so constructed and positioned that power may be transmitted either to the dasher of the washing machine or the wringer, or to both, simultaneously.

Another object of the invention is to provide a simple form of shifting lever and clutch through which power may be transmitted to drive the wringer in either direction.

Further objects will hereinafter appear.

The invention consists of the parts and the construction and combination of parts as hereinafter more fully described, having reference to the accompanying drawings in which—

Figure 1:
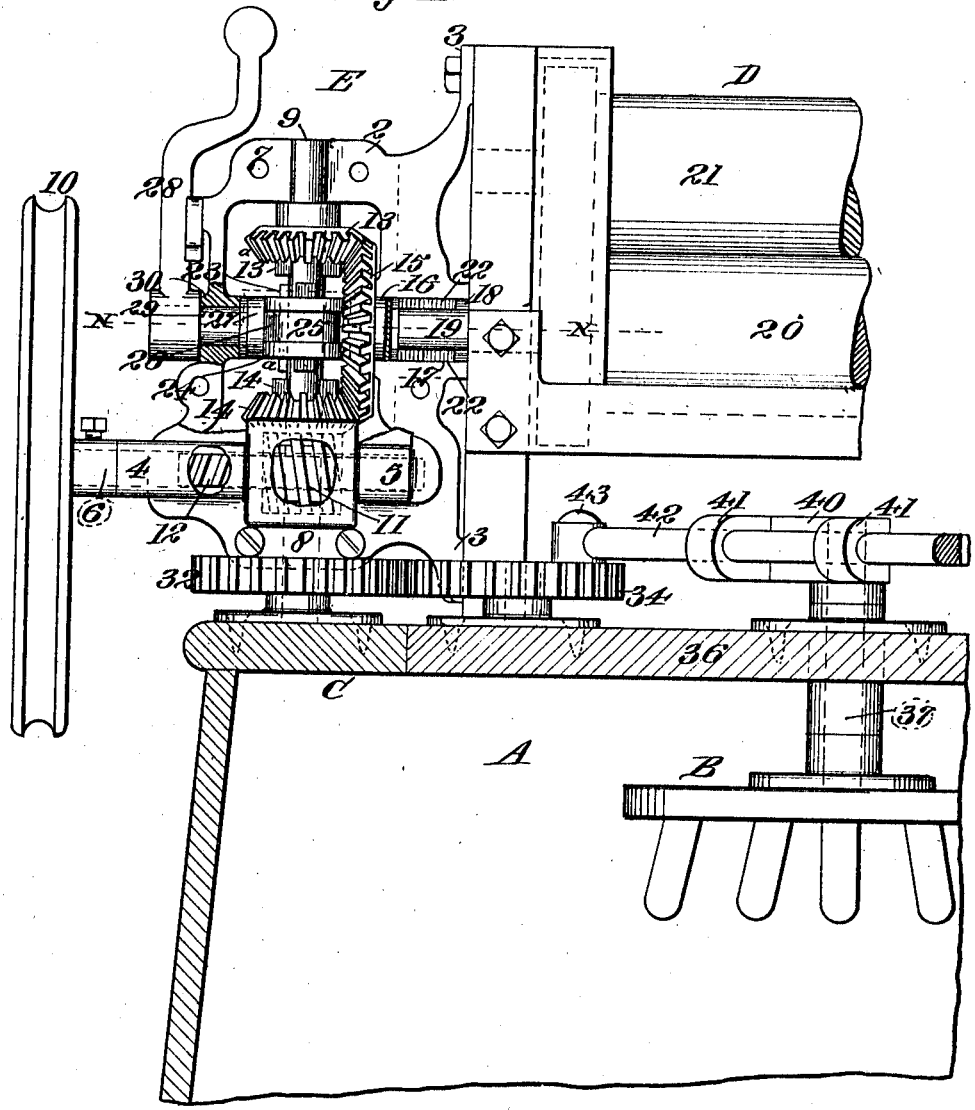
Figure 2:
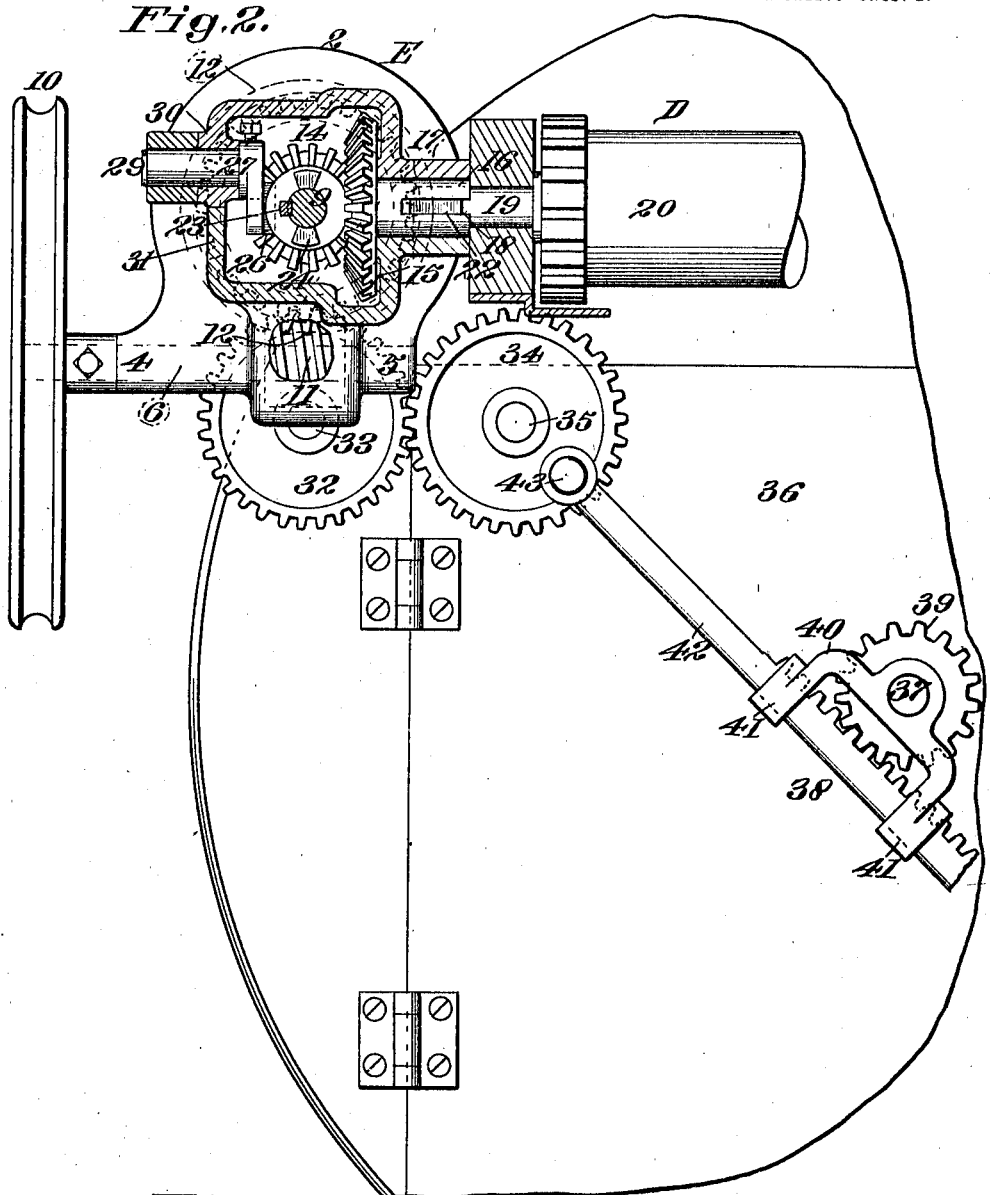
Figure 3:
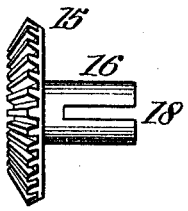

Figure 1 is a front elevation of the washing machine, partly broken away, showing the transmission gearing casing in section. Fig. 2 is a plan section on line X—X, Fig. 1. Fig. 3 is a detail view of gear 15.

Referring to the drawings, A indicates the tub of a washing machine; B a dasher of the usual construction; C the cover and D the wringer.

The transmission gearing generally indicated at E through which power is transmitted to the washer and wringer forms the subject matter of the present invention, and is constructed as follows:

2 indicates a casing which is suitably secured as at 3 to the end of the wringer. Journaled in said casing as at 4 and 5 is a horizontally positioned shaft 6, and journaled in bearings 7 and 8 is a vertically disposed intermediate shaft 9. Secured on shaft 6 outside of the casing is a driving pulley 10, and secured on the center of said shaft between bearings 4 and 5 is a worm gear 11. Secured on the intermediate shaft 9 and intermeshing with worm gear 11 is a worm wheel 12, and loosely mounted on the same shaft above the worm wheel is a pair of opposed bevel pinions 13 and 14, on the inner faces of which are formed projecting clutch jaws 13$^a$ and 14$^a$. Interposed between gears 13 and 14 and intermeshing with same is a bevel gear 15 provided with a hollow hub extension 16 which is journaled as at 17 in the side of the casing. The hollow hub is partly slotted at 18, and the main driving shaft 19 of the wringer through which power is transmitted to rolls 20 and 21 projects partly into said hollow hub and is provided with keys 22 which project into the slotted end 18 of the hub. A simple driving connection is thus formed between gear 15 and the main shaft of the wringer which permits the parts to get out of alinement more or less with each other without affecting the efficiency of the transmission mechanism.

Slidably mounted on a key 23 secured in the intermediate shaft 9 is a jaw clutch 24, the center portion of which is grooved as at 25. Projecting into said groove is a pin or lug 26 which is secured upon the outer end of a crank-arm 27, which in turn is operated by a lever 28, lever 28 and crank 27 being secured on a short shaft section 29, which is journaled in the casing as indicated at 30.

Suitably secured on the lower end of the intermediate shaft 9 below the casing is a spur gear 31, and intermeshing with said gear is a second spur gear 32 which in this instance is mounted on a stud shaft 33 secured in the cover portion of the tub. Intermeshing with gear 32 is a third spur gear 34; this is revolubly mounted on stud shaft 35 which is secured upon a hinged cover 36 of the tub. 37 indicates the shaft upon which dasher B is secured; this is journaled in the center of cover 36 as indicated at 38, and secured to the upper end of said shaft is a spur gear 39. Loosely mounted on the shaft is a U-shaped yoke 40, and slidably mounted in bearing extensions 41, formed on the outer ends of the yoke, is a rack-bar 42. The teeth on the outer end of this rack-bar intermesh with gear 37 and the opposite end of the bar is secured crank-wise as at 43 to gear 34.

Power may be transmitted to the driving pulley through an electric motor or other suitable means not here shown; and the operation of the transmission mechanism will be as follows: The revolving movement of pulley 10 when clutch 24 is positioned intermediate of gears 13 and 14 will be transmitted through shaft 6, worm gear 11, worm wheel 12 to intermediate shaft 9. It is then transmitted through gears 31 and 32 to gear 34, causing rack-bar 42 to reciprocate with relation to yoke 40. The reciprocating movement of the rack-bar 42 is in turn transmitted to gear 37 with connected shaft and dasher B, causing this to oscillate in the usual manner. Pinions 13 and 14, with connected bevel gear 15, will in this instance remain stationary as they are loosely mounted upon the intermediate shaft 9. It is, however, possible to throw the wringer into operation at any time by rocking the lever 28 to one side or another. This movement is transmitted through crank-arm 27 and pin 26 to move the jaw clutch either into engagement with the jaws on gear 13 or 14. If clutch 24 is moved into engagement with the clutch jaw 13$^a$ it can be seen that power will be transmitted through the intermediate shaft 9, clutch 24, gears 13 and 15, to revolve shaft 19 with connected wringer rolls in one direction; while, if it is desired to reverse the movement of the wringer, it is only necessary to swing lever 28 in the opposite direction which will immediately bring the clutch jaw into engagement with gear 14, causing this to become the driver. The movement through gear 15 and shaft 19 is consequently reversed, and the desired result is secured.

The transmission constructed as here shown is very easily controlled as it is operated by just one lever, being that indicated at 28. By shifting this lever a trifle the wringer can be made to move either forward or backward. It can thus be seen that it is possible to wash and wring at the same time; for instance, clothes can be rung back from the rinse or blueing water while a tub-full of clothes is being washed.

The transmission mechanism is compact and substantial in construction, and the gears contained in the same are completely inclosed by casing 2. This arrangement permits of the casing being filled with grease or oil, making it absolutely noiseless and fool-proof.

The arrangement of gears 33 and 34 permits the hinged cover 36 to be opened or closed at any time without throwing the gears out of mesh, or disturbing the connections in any manner.

Any suitable form of wringer may be used and attached to the stationary part of the tub; the connection between the transmission mechanism and driving shaft of the wringer being so simple that the device may be applied by practically any person.

The materials and finish of the several parts of the transmission may be such as the experience and judgment of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is:

1. A driving mechanism including a support having a hinged section, a spur gear on the support, means for driving the spur gear, a second spur gear meshing with the first gear and mounted on the hinged section of the support, said second spur gear lying in the plane of the first gear and itself being moved with the hinged section, when the latter is swung, without throwing the spur gears out of mesh, and mechanism operable by the second spur gear.

2. A driving mechanism including a support having a hingedly mounted section, a spur gear on the support, a second spur gear on the hinged section and meshing with the first gear, the line of the intermeshing teeth of the gears lying in a vertical plane including the hinged mounting of the section whereby the latter may be moved without throwing the spur gears out of mesh, drive means for the first spur gear, and mechanism operable by the second spur gear.

In testimony whereof I have hereunto set my hand in the presence of two subscribing witnesses.

CHRIS P. JOHNSON.

Witnesses:
 JOHN H. HERRING,
 W. W. HEALEY.

Copies of this patent may be obtained for five cents each, by addressing the "Commissioner of Patents, Washington, D. C."